United States Patent
Lee et al.

(10) Patent No.: US 7,532,877 B2
(45) Date of Patent: May 12, 2009

(54) SYSTEM AND METHOD FOR VOICE SCHEDULING AND MULTIMEDIA ALERTING

(75) Inventors: Johnny H. Lee, Mountain View, CA (US); Aristotle H. Cruz, Hayward, CA (US); Fadi R. Jabbour, Sunnyvale, CA (US); David C. Lee, Sunnyvale, CA (US); Labhesh Patel, Mountain View, CA (US)

(73) Assignee: Cisco Technology, Inc., San Jose, CA (US)

( * ) Notice: Subject to any disclaimer, the term of this patent is extended or adjusted under 35 U.S.C. 154(b) by 722 days.

(21) Appl. No.: 10/851,317

(22) Filed: May 21, 2004

(65) Prior Publication Data

US 2005/0260974 A1 Nov. 24, 2005

(51) Int. Cl.
*H04M 11/10* (2006.01)
(52) U.S. Cl. .................... 455/412.2; 455/567
(58) Field of Classification Search ............. 455/412.2, 455/567, 414, 1, 418–420, 403; 379/201.1, 379/211.01
See application file for complete search history.

(56) References Cited

U.S. PATENT DOCUMENTS

| | | | |
|---|---|---|---|
| 6,041,130 A | 3/2000 | Goss | 381/374 |
| 6,047,053 A | 4/2000 | Miner et al. | 379/201 |
| 6,263,201 B1 * | 7/2001 | Hashimoto et al. | 455/403 |
| 6,377,568 B1 | 4/2002 | Kelly | 370/352 |
| 6,385,646 B1 | 5/2002 | Brown et al. | 709/217 |
| 6,442,247 B1 | 8/2002 | Garcia | 379/88.18 |
| 6,665,396 B1 | 12/2003 | Khouri et al. | 379/266.01 |
| 2003/0095651 A1 * | 5/2003 | Book et al. | 379/211.01 |
| 2004/0066924 A1 * | 4/2004 | Wertsberger | 379/201.01 |
| 2004/0224671 A1 * | 11/2004 | Benco et al. | 455/414.1 |
| 2005/0096095 A1 * | 5/2005 | Benco et al. | 455/567 |
| 2006/0019702 A1 * | 1/2006 | Anttila et al. | 455/556.1 |

OTHER PUBLICATIONS

U.S. Appl. No. 10/754,734, entitled "Method and system for Managing Communication Sessions Between a Text-Based and a Voice-Based Client," filed Jan. 8, 2004, 52 pages.
U.S. Appl. No. 10/754,963, entitled "Method and System for Managing Conference Resources," filed Jan. 8, 2004, 45 pages.

* cited by examiner

*Primary Examiner*—CongVan Tran
(74) *Attorney, Agent, or Firm*—Baker Botts L.L.P.

(57) ABSTRACT

A method for communicating a reminder message includes establishing a first connection between a user and a reminder center. The method includes communicating, from the user to the reminder center, a reminder time. The method also includes scheduling a reminder message at the reminder center, and terminating the first connection between the user and the reminder center. The method includes selecting, at the reminder center, a preferred endpoint associated with the user, from a plurality of endpoints associated with the user. The method also includes attempting to establish a second connection between the user and the reminder center, using the preferred endpoint associated with the user, at is approximately the reminder time, and communicating the reminder message from the reminder center to the user.

51 Claims, 2 Drawing Sheets

SYSTEM AND METHOD FOR VOICE SCHEDULING AND MULTIMEDIA ALERTING

TECHNICAL FIELD OF THE INVENTION

This invention relates in general to schedule management tools, and more particularly to a method and system for voice scheduling and multimedia alerting.

BACKGROUND OF THE INVENTION

Caller service facilities have historically been used to allow users to accomplish many tasks. Mail order purchases, customer technical support, and banking services are just a few examples of the list of services offered through caller service facilities. A caller service facility can be completely staffed by operators who answer all of the incoming calls, or the caller service facility could incorporate call handling technology such as an interactive voice response (IVR) system. A caller service facility having an IVR system can be set up to perform many functions, but, in summary, the caller service facility can answer incoming calls and the IVR may, through the use of an automated menu, either address the callers reason for calling, or determine the proper operator to direct the call to. IVR systems can utilize dual-tone multiple frequency (DTMF) menu responses, or could incorporate voice recognition technology such that a user speaks their responses to the menu options.

Various methods have been utilized for scheduling reminders to be delivered in the future. Personal assistants or secretaries could record appointments and provide alerts of the pending appointments. Software based scheduling tools, such as Microsoft Corporation's Outlook™ program, allow users to schedule appointments and receive reminders with event details on computers running the program. Additionally, Hotel answering services have allowed guests to schedule wake up calls for particular times. Such systems are limited in the manner in which reminders can be scheduled, the management of the content of the reminder message, and available methods of communication of the reminder.

SUMMARY OF THE INVENTION

In accordance with the present invention, the disadvantages and problems associated with scheduling and receiving appointment reminder alerts have been substantially reduced or eliminated. In particular, the system and method described herein provide scheduling flexibility and convenience through a voice enabled front end, and reminders that are medium versatile.

In accordance with one embodiment of the present invention, a method for communicating a reminder message includes establishing a first connection between a user and a reminder center. The method includes receiving, from the user, a reminder time. The method also includes scheduling a reminder message at the reminder center, and terminating the first connection between the user and the reminder center. The method includes selecting, at the reminder center, a preferred endpoint associated with the user, from a plurality of endpoints associated with the user. The method also includes attempting to establish a second connection between the user and the reminder center, using the preferred endpoint, at approximately the reminder time, and communicating the reminder message from the reminder center to the user.

The method may also include selecting the preferred endpoint associated with the user by determining, using a presence server, which of the plurality of endpoints associated with the user is available to the user at approximately the reminder time. The preferred endpoint associated with the user can be selected from a predefined priority list provided by the user. The method may further include continuing to attempt to establish the second connection using different ones of the plurality of endpoints, in an order of the predefined priority list, until the second connection is established. The method may also include a reminder message comprising a recorded voice message in the user's voice.

In accordance with another embodiment of the present invention, a method for scheduling a reminder includes establishing a first connection between a user and a reminder center, receiving, from the user, a reminder time, scheduling a reminder message at the reminder center, and terminating the first connection between the user and the reminder center. The method includes attempting to establish a second connection between the user and the reminder center at approximately the reminder time, detecting that the user is communicating with a third party over an existing communication connection, and communicating the reminder message to the user while maintaining the existing communication connection.

Technical advantages of certain embodiments of the present invention include scheduling tools which are more flexible and more easily accessible. In addition, the method obviates the more expensive human operator alternatives, such as assistants or hotel services by providing the ability to schedule appointments and tasks through the convenience of any voice enabled interface. The method may also provide other benefits in convenience and cost savings because the users no longer have to carry the usual digital devices but can receive reminders on any endpoint.

Other technical advantages of certain embodiments of the present invention include the ability of a single system to service a large number of users while retaining flexibility in message delivery. This will have the effect of making upgrades and maintenance centralized and more efficient.

Other technical advantages of the present invention will be readily apparent to one skilled in the art from the following figures, descriptions, and claims. Moreover, while specific advantages have been enumerated above, various embodiments may include all, some, or none of the enumerated advantages.

BRIEF DESCRIPTION OF THE DRAWINGS

For a more complete understanding of the present invention and its advantages, reference is now made to the following description, taken in conjunction with the accompanying drawings, in which.

DETAILED DESCRIPTION OF THE INVENTION

Figure 1:
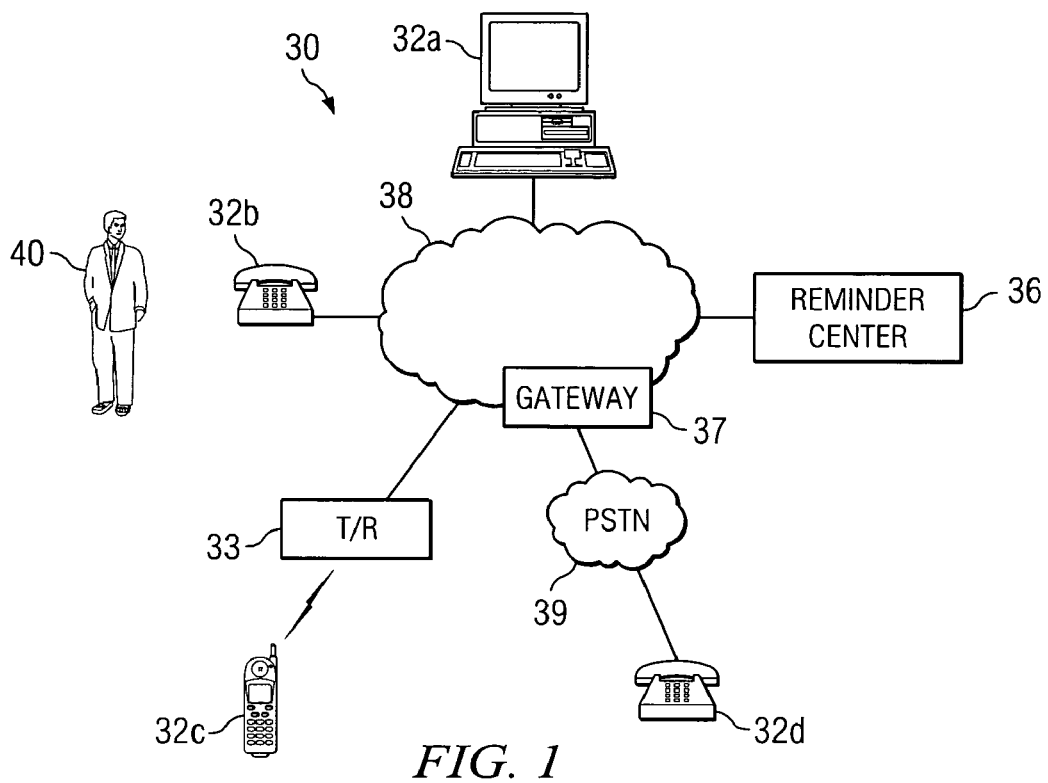
FIG. 1 illustrates a communication system with a plurality of endpoints and a reminder center, in accordance with a particular embodiment of the present invention.

FIG. 1 illustrates communication system 30 including a plurality of endpoints 32a–32d, each having the ability to establish communication sessions with each other, and with reminder center 36. Such communication sessions may be established using communication networks 38, 39, and/or additional endpoints, components, or resources coupled with communication networks 38 or 39.

The teachings of the present invention provide a system and method for reminding an individual of scheduled events. A user 40 establishes a connection with the reminder center 36 using an endpoint 32a–32d. User 40 communicates to the reminder center 36 a reminder time and a reminder message. At approximately the reminder time, the reminder center 36 establishes contact with an endpoint 32a–32d associated with the user 40, and relates the reminder message to user 40. A wide variety of endpoints 32a–32d may be used to both schedule and receive reminders. Further, the endpoint 32a–32d used to schedule the reminder is not necessarily the endpoint 32a–32d contacted by the reminder center 36 to relate the reminder message to the user 40. This allows for scheduling in the most convenient manner while retaining flexibility in determining the best method to deliver the reminder message.

Endpoints 32a–32d may be any combination of hardware, software, and/or encoded logic that provide communication services to a user 40. For example, endpoints 32a–32d may include any voice, DTMF (touch tone), or text enabled endpoint, including but not limited, to a PC, telephone, IP Phone, cellular, mobile or wireless phone, paging device, facsimile machine, or PDA. In the illustrated embodiment, endpoints 32a–32d include a personal computer, an internet telephone, wireless handset, and an analog telephone, respectively. A wireless base station transmitter/receiver 33 couples endpoint 32c with communication network 38. Endpoints 32a–32d may also include unattended or automated systems, gateways, other intermediate components or other devices that can establish media sessions. Although FIG. 1 illustrates four endpoints 32a–32d, communication system 30 contemplates any number and arrangement of endpoints 32a–32d for facilitating a connection between reminder center 36 and user 40.

Although specific communication networks 38 and 39 are illustrated in FIG. 1, the term "communication network" should be interpreted as generically defining any network capable of transmitting audio and/or video telecommunications signals, data and/or messages. Communication network 38 may be any computer or communication network capable of coupling two or more endpoints 32a–32d, for communication. In the illustrated embodiment, communication network 38 is a wide area network (WAN) that enables communication between a plurality of endpoints distributed across multiple cities and geographic regions, and communication network 39 is a public switched telephone network (PSTN). However, communication networks 38 and/or 39 may be one or more networks, including the Internet, the public switched telephone network, local area networks (LANs), global distributed networks such as intranets, extranets or other form of wireless or wireline communication networks.

Generally, communication networks 38 and 39 provide for the communication of packets, cells, frames and/or other portions of information (generally referred to as packets) between and among endpoints 32a–32d. Communication paths for the communication of such packets may include any combination of routers, hubs, switches, gateways (e.g., gateway 37) or other hardware, software or embedded logic implementing any number of communication protocols that allow for the exchange of packets in communication system 30.

In a particular embodiment, communication network 38 employs communication protocols that allow for the addressing or identification of endpoints 32a–32c coupled to communication network 38. For example, using Internet protocol (IP), each of the components coupled together by communication network 38 in communication system 30 may be identified in information directed using IP addresses. In this manner, communication network 38 may support any form and combination of point-to-point, multicast, unicast or other techniques for exchanging media packets among components in communication system 30.

Any given communication session between two of endpoints 32a–32c will include the transfer of packets across one or more communication paths, that couple endpoints 32a–32d and/or reminder center 36 across communication network 38. Such paths may include any combination of network components, gatekeepers, call managers, routers, hubs, switches, gateways, endpoints or other hardware, software or embedded logic implementing any number of communication protocols that allow for the exchange of packets in communication system 30.

Communication network 38 may be directly coupled to other IP networks including, but not limited to, the Internet. Since IP networks share a common method of transmitting data, telecommunication signals may be transmitted between telephony devices located on different, but interconnected, IP networks.

In addition to being coupled to other IP networks, communication network 38 may also be coupled to non-IP telecommunication networks through the use of gateway 37. For example, communication network 38 is coupled to Public Switched Telephone Network (PSTN) 39. PSTN 39 includes switching stations, central offices, mobile telephone switching offices, pager switching offices, remote terminals and other related telecommunications equipment that are located across the country.

The technology that allows telecommunications to be transmitted over an IP network may be referred to as Voice over IP (VoIP). In the illustrated embodiment, endpoints 32a–32c and reminder center 36 are IP telephony devices. IP telephony devices have the capability of encapsulating a user's voice (or other inputs) into IP packets so that the voice can be transmitted over communication network 38. Similarly, IP telephony devices 32a–32c have the capability of capturing and encapsulating video into IP packets so that the video can be transmitted over communication network 38. Conversely, IP telephony devices 32a–32c have the capability of receiving audio or video IP packets from the communication network 38 and playing the audio or video data to a user.

A codec (coder/decoder) at the endpoint converts the voice, video or fax signals generated by the users of the telephony devices from analog media signals into digital form. The codec may be implemented either in software or as special-purpose hardware in the endpoints. In the case of an IP telephone, as the user speaks into the handset, the codec converts the analog voice signals into digital data. The digitally encoded data is then encapsulated into IP packets so that it can be transmitted over communication network 38. Conversely, another codec at the receiving endpoint converts the digital data into analog media for the users of the telephony devices. In the case of an IP telephone, digital data from IP encapsulated packets are received from the communication network 38. The codec at the receiving endpoint converts the digital voice, video or fax data from the communication network 38 into analog media to be played to the users of the telephony devices.

Gateway 37 may accomplish several functions, such as converting analog or digital circuit-switched data transmitted by PSTN 39 to packetized data transmitted by communication network 38 and vice-versa. When voice data packets are transmitted from communication network 38, gateway 37 retrieves the data contained in the incoming packets and converts this digital data to the analog or digital format used by the PSTN trunk to which gateway 37 is coupled. Since the digital format for voice transmissions over an IP network is often different than the format used on the digital trunks of PSTN 39, the gateway provides conversion between these different digital formats, which is referred to as transcoding. Gateway 37 also translates between the VoIP call control system and other signaling protocols (e.g., SS7, T1, ISDN, etc.), used in PSTN 39.

For voice transmissions from PSTN 39 to communication network 38, the process is reversed. In a particular embodiment, gateway 37 takes the incoming voice transmission (in either analog or digital form) and converts it into the digital format used by communication network 38. The digital data is then encapsulated into IP packets and transmitted over communication network 38.

Figure 2:
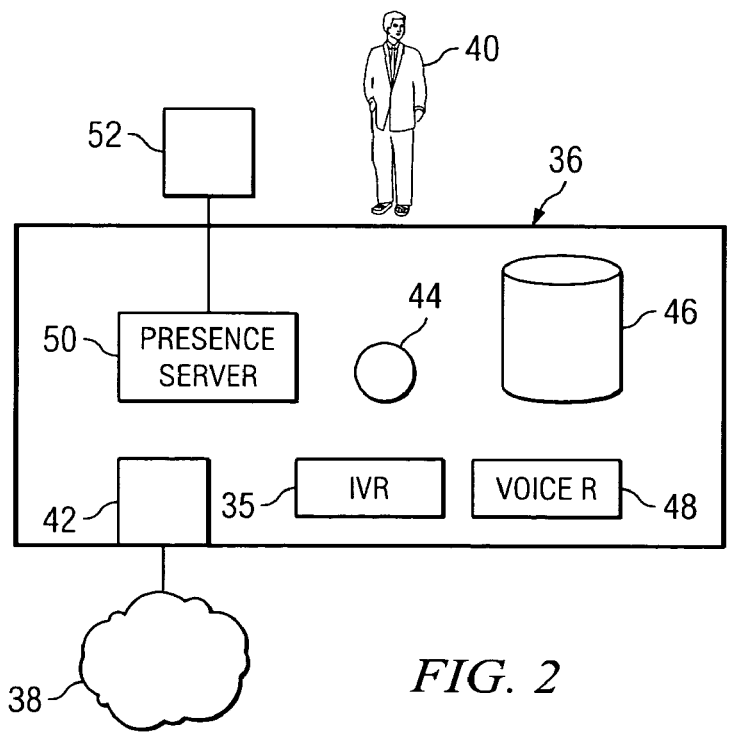
FIG. 2 illustrates the reminder center of FIG. 1 in more detail, in accordance with a particular embodiment of the present invention.

FIG. 2 illustrates reminder center 36 in more detail. In the illustrated embodiment reminder center 36 contains a processor 44, database 46, network interface 42, interactive voice response (IVR) system 35, voice recorder 48, and presence server 50. User 40 is also shown with associated endpoint 52 as well as communication network 38.

Processor 44 may be a microprocessor, controller or any other suitable computing device or resource. Database 46 may be any form of volatile or nonvolatile memory including, without limitation, magnetic media, optical media, random access memory (RAM), read only memory (ROM), removable media or any other suitable local or remote memory component.

Communication network 38 is shown coupled to reminder center 36 via network interface 42. Network interface 42 allows reminder center 36 to communicate over communication network 38 with endpoints 32a–32d or any devices connected to communication network 38. Connections between networked devices, including endpoints 32a–32d and reminder center 36, can be initiated by any device connected to communication network 38. When user 40 utilizes a networked device to establish contact with reminder center 36, user 40 will be presented options for scheduling a reminder. User 40 communicates her chosen reminder options to reminder center 36, and reminder center 36 stores the options for the reminder message in database 46. At a later time, reminder center 36 retrieves the reminder options from database 46 and conveys a reminder message to user 40 in accordance with those reminder options.

Entry of reminder options can be streamlined and simplified by use of an IVR system 35. The purpose of the IVR system 35 is to exchange information with a user automatically, without human interaction. IVR system 35 may be used to collect information from a calling party using analog signals generated by a human voice, DTMF, or other sound, and/or digital signals where the calling party includes the ability to generate digital signals. Accordingly, IVR system 35 automates the retrieval and processing of information by phone in order to automate telephone based tasks. Communication of reminder options is streamlined by removing the need for human operators In the illustrated embodiment the reminder center also comprises a voice recorder 48. One of the possible reminder options available to a user 40 is the ability to schedule a reminder message in their own voice. In this manner a user has complete control of the message content and can place emphasis as the user 40 desires. If the user 40 chooses to record an audio reminder for later playback, the voice recorder 48 is turned on to record the user's message. Once recording is complete, the message and related information about the user's identification and reminder time are recorded in database 46. At approximately the reminder time, reminder center 36 will retrieve this information in order to contact the user 40 and playback the previously recorded reminder message.

In the illustrated embodiment, reminder center 36 also includes a presence server 50. Presence server 50 may be any combination of hardware, software and/or encoded logic. In one embodiment presence server 50 utilizes session initiation protocol (SIP) technology to detect and/or monitor the presence of a particular user (e.g., user 40) at an endpoint, and associate a call with a user's presence. Other non-SIP presence techniques known in the art may be used in other embodiments. To accomplish such functionality, presence server 50 may have access to any relevant information relating to or associated with the endpoints 52 the user 40 utilizes or accesses to communicate with the reminder center 36.

Components of communication system 30 may utilize SIP technology in the transmission of audio, video or other data across the system. As a result, users of endpoints 32a–32d may be identified by components of communication system 30 according to a uniform reference identifier (URI), such as a user's e-mail address, or other suitable identifier so that a user may be located, monitored and/or contacted through presence detection technology. The use of presence detection by components of communication system 30 enable the components to capture information about various communication devices, or endpoints, available to a user, and their status, such as whether a cellular phone is switched on or whether a user is logged into a personal computer (PC).

In accordance with particular embodiments, reminder center 36 may use presence detection to "locate" user 40. In one embodiment, reminder center 36 may be configured to detect the "presence" of user 40. For example, if user 40 is presently logged onto his home computer, using his cell phone, sending or receiving messages from an Instant Messaging client, or using a PDA with which presence server 50 has the ability to detect and/or communicate with, then presence server 50 will be aware of the device's presence on communication network 38, and will associate the device's presence with the user. It will be recognized by those of ordinary skill in the art that endpoint 52 may be any type of endpoint described within this specification, and that any particular user (e.g., user 40) may have one or more endpoints with which they are associated and/or use. Therefore, at approximately the reminder time the reminder center 36 may query the presence server 50 to determine which endpoint 52 associated with a user 40 is the best way of contacting user 40.

In the illustrated embodiment, the presence server 50 is shown as incorporated into reminder center 36; however, one skilled in the art would recognize that presence server 50 could just as readily be located at a remote location or be accessible over communication network 38. Further, endpoint 52 is illustrated as coupled to presence server 50. One skilled in the art would recognize that endpoint 52 could just as readily be located at a remote location or be accessible over communication network 38.

Figure 3:
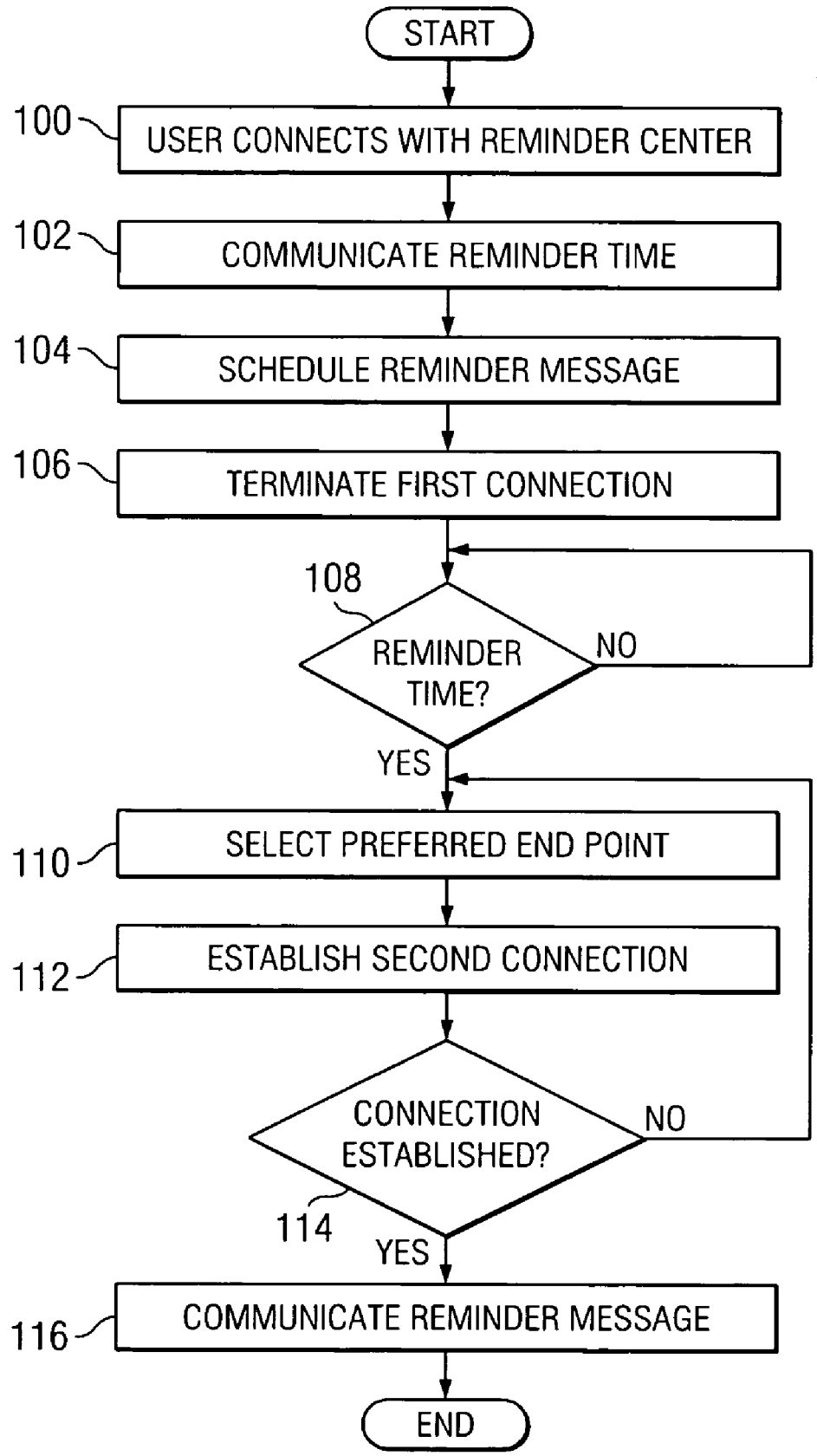
FIG. 3 illustrates a method for communicating reminder messages, in accordance with a particular embodiment of the present invention.

FIG. 3 is a flow chart illustrating a method for scheduling and communicating reminders, in accordance with a particular embodiment of the present invention. The method starts at step 100 with the user connecting with the reminder center. The connection at step 100 can be accomplished by any of the endpoints 32a–32d over communication networks 38 or 39.

Once connected the user would be able to touch-tone or speak responses to an automated menu, which would walk the user through the steps necessary to set up a reminder. In one embodiment an IVR system comprising voice recognition technology is utilized that allows the user to speak commands without the necessity of a touch tone keypad. The advantage of this is that scheduling of a reminder could occur from any voice-enabled endpoint without the necessity of a human operator or touch tone capability. Alternate embodiments of the present invention could utilize human operators or IVR systems without voice recognition capabilities. A further alternative to the illustrated embodiment would involve the user communicating the scheduling information to the reminder center via e-mail, IM, or a text message from a PDA or other text capable endpoint. A still further embodiment would allow scheduling of a reminder over an internet or web interface either through speech commands, text communications, or file transfers.

Step 102 illustrates the user communicating a reminder time. In the illustrated embodiment the user communicates the approximate time that the reminder is to be delivered. An alternate embodiment allows the user to input the time of an appointment and a period of time prior to the appointment when the reminder should be communicated. This allows the user to determine how much travel or preparation time will be required, and have the reminder message communicated accordingly. Alternatively, reminder center 36 could have default periods of time, perhaps 5 or 15 minutes, prior to the scheduled appointment at which the reminder message is communicated. These early reminders could be accompanied by a note that the communicated reminder is for an event starting after the end of the default period of time.

At step 104 user 40 schedules the reminder message. In one embodiment the user speaks or text messages, exactly, the content of the reminder message. If the reminder message is spoken by the user 40, the reminder center may record the user's voice reciting the message, utilizing voice recorder 48, and saves it for later playback. If the message is given in text format it also may be stored for later playback or text communication. The advantages of such a system are that it provides ultimate flexibility and specificity in scheduling reminder messages. In an alternate embodiment the user could select from an automated list of reminders. While this alternative would reduce flexibility and specificity of scheduling, it could have the advantage of allowing advanced users to accomplish scheduling more quickly.

Once the reminder time and reminder message have been communicated by the user, the user has the options, at least, of scheduling an additional reminder or exiting the system. If the user chooses to exit the system the connection is terminated until approximately the reminder time. This is illustrated in step 106.

Step 108 illustrates timer logic which the reminder center iterates until approximately the reminder time. In the presently illustrated embodiment the reminder center moves to step 110 at the reminder time. In alternate embodiments the reminder center can be programmed to advance to step 110 at a predetermined time before the reminder time to allow for connection and/or processing time and thereby reduce incidents of delayed reminders.

The illustrated embodiment has the additional functionality of allowing users to call in at any time and check and/or modify the reminders they have set. In this manner the user does not have to wait until the reminder time and can be proactive in assessing their schedule for more extended periods. Further, if a reminder message needs to be updated due to a changed meeting time or location, the user can change the reminder time or, if need be, schedule a new reminder message. The user may also cancel any reminder which is no longer necessary, such as a reminder for a cancelled meeting.

The reminder center selects a preferred endpoint associated with the user at step 110. The preferred endpoint is the endpoint used to attempt to establish contact with the user. The preferred endpoint is used because it was designated as, or determined to be, the most probable method of contacting the user. Any user may have multiple endpoints associated with them and a method is used to determine which endpoint is appropriate.

In the illustrated embodiment, the preferred endpoint is chosen by querying the presence server. If the user is logged on and using their office or home computer, the presence server will indicate this. If this is the best method of contacting the user at approximately the reminder time, then it will be the preferred endpoint, and the reminder center would know to send an e-mail to the user at the indicated location. Likewise, if the user is connected to an IM client such as a PDA or PC, this could be the preferred endpoint. When a user is logged onto multiple endpoints the presence server may choose the preferred endpoint based on the endpoint from which the user last communicated.

Establishing a connection with the preferred endpoint is illustrated in step 112. Step 114 determines if the connection is established, and if the connection is not established, the illustrated embodiment selects a new preferred endpoint at step 110. The preferred endpoint is chosen in the same manner as previously discussed, except that the reminder center now has the additional information that the first endpoint is no longer the best method of contacting the user. Endpoints are tried in this manner until contact is established. In an alternate embodiment the reminder center may choose to send reminders to each device, and/or require an explicit confirmation of receipt. Alternate embodiments could require an explicit confirmation from the user regardless of the contact method or number of reminders sent to distinct endpoints.

An endpoint list may be compiled that includes endpoints associated with the user. The list could be a standardized list that the reminder center is programmed to attempt for each reminder message. The list could also be a list of endpoints compiled by the user, or a list of endpoints identified by a presence server. Various combinations of these options for compiling a list could also be possible, for example, the reminder center could have a standardized list which is cross referenced with information available from the presence server to determine which endpoints on the list are available to a particular user. Alternatively, the user could define a list of endpoints which are generally available to the user, and the reminder center could use information from the presence server to determine which endpoints are available to the user at approximately the reminder time.

When endpoints are tried one at a time in a serial fashion, as illustrated by the loop between step 114 and step 110, the reminder center may terminate iteration through the endpoint list when confirmation is received. If the reminder center does not receive the confirmation, the reminder center will use the alerting rules to determine the new preferred endpoint to contact the user. Alternatively, confirmation may be irrelevant if the reminder message is sent to all available endpoints. In this embodiment the reminder center may need only check if new endpoints associated with the user have become available after the original reminder messages were sent. In one of the above listed ways the reminder center would be certain to have either properly relayed the message to the user, or at least have attempted every available method to alert the user.

In an alternate embodiment, instead of using the presence server, the reminder center may employ a predefined list of contact methods. The "preferred" endpoint would initially be the first endpoint on the list. Subsequently, the preferred endpoint would be designated as the next endpoint on the list until a connection is established or all endpoints are exhausted.

In this embodiment, the reminder center would utilize one predefined list for all users. Thus, the reminder center would always attempt to contact a user by the first endpoint on the list first, and the second endpoint on the list second, etc., until contact is established or the list is exhausted. Not every user will have the same endpoints associated with them. For example, one user may own a wireless telephone but not have a PC, while another user may have a PC at both home and work, but not have a wireless telephone. Therefore some endpoints would not be attempted for particular users, but the predefined list of endpoints would not vary across users or reminders. If the reminder center does not have contact information for an endpoint associated with a user when attempting to contact that user, the reminder center would skip that endpoint on the predefined list and attempt contact by the next endpoint on the list. This embodiment would have the advantage of easier implementation and user training than more complex embodiments.

In a further alternative embodiment, the list of endpoints could be user defined. Each user could establish their unique default hierarchy of contact methods or could even establish preferred contact methods for each individual reminder. This would allow a user to determine the most probable method of contact and provide greater flexibility to adapt to changing conditions such as travel or situations where the user does not want to be interrupted by an endpoint such as a telephone. The "preferred" endpoint would initially be the first endpoint on the user defined list. Subsequently, the preferred endpoint would be designated as the next endpoint on the list until a connection is established or all endpoints are exhausted.

The illustrated embodiment would also allow a user to determine if there is a particular format the reminder message should take, or if there is a particular endpoint the user wants it delivered to. The user may have multiple endpoints capable of receiving messages in a given format. For instance, the user could direct that he wants to receive a verbal reminder. The system would then attempt to contact the user on voice capable endpoints such as the user's wireless telephone or other associated telephone. If the user selected a text format for the reminder the reminder center would only send the reminder to text enabled endpoints such as a PC or PDA via e-mail, text messaging, or IM. Further, if the user is aware of upcoming travel and knows the only way to contact him is, for example, by wireless telephone, the user can specify this as the first or only endpoint to contact. In this manner the user could override any default hierarchy or presence server instruction and receive the message in only the most convenient manner.

If the connection is not established at step 114, another preferred endpoint is selected at step 110. If the connection is established at step 114, the reminder message is communicated to the user. Steps 110, 112, and 114 are repeated until contact with the user is established or the list of endpoints associated with the user is exhausted. In the event the user was not contacted for a specific reason, for example, the user was on the phone when the reminder center attempted contact, a predetermined set of rules, either default or user defined, determines how the reminder is handled. Some available options could include: recording the reminder message on the voicemail or answering machine of the user, sending the user an e-mail or text message with or without a confirmation requirement, sending the user an e-mail or IM with the uniform resource locator (URL) of the audio reminder in a computer readable format, or interrupting an ongoing call and "whispering" the reminder to the user.

If the user were sent a URL containing the audio file in a computer readable format, the user would only need to click on the URL to hear the reminder message. In this manner the user could listen to, and control the volume of, the message while engaged in another activity such as a telephone conversation.

Whispering allows the reminder center to break-in to an existing call when the user has an ongoing call with a third party. Once a connection is established between the reminder center and the user, the incoming audio stream from the third party is mixed with the incoming audio stream from the reminder center such that the user can hear both audio streams simultaneously. In this manner the user can be alerted of the reminder without being disconnected from the third party. In an alternate embodiment the whisper mode of reminder message delivery is not only a failure scenario, but can be a first choice method of delivery on a preferred endpoint.

How these options are executed may be decided by default alerting rules or may be defined by the user. In particular, if the user determines he would like an ongoing call interrupted to allow whispering of the reminder message, then the user defined features might include whether the third party can hear the reminder, and the volume of the whispered reminder.

A further feature of the illustrated embodiment is the ability of the user to establish different priority ringers or priority text messages. In this way it is possible for the user to readily discern the importance of the reminder and determine how important it is to listen to the reminder while otherwise engaged. An example would be sitting in an informal meeting when the reminder center is attempting contact with a high priority message. The user would know that listening to the reminder should not be put off until after the meeting.

In one embodiment, once contact is established the reminder center checks to make sure the user has not activated a delay or "snooze" timer. At any time during the reminder message the user can invoke the snooze option and immediately stop the playing of the reminder until after a set period of time. Once the set period of time has elapsed, the reminder center will reestablish contact with the user and attempt to play the reminder again. The length of the snooze timer could be a default amount of time, an amount of time predefined by the user, or an amount of time the user selects upon invoking the snooze timer.

In an alternate embodiment the priority ringers and snooze timer could be related such that successive contacts following snooze periods escalate in priority. In this manner the user is more aware of the length of time that has passed and is less likely to continue to delay the reminder. Additionally, if information on the time of a meeting is available to a reminder center, the priority of a snoozing reminder could escalate to the highest setting immediately before a scheduled event is to take place. If the event time is approaching during a snooze period, the snooze period could be cut short in order to make a final high priority contact attempt.

Step 116 shows the final step after contact is established and no snooze timers are activated. As illustrated, the reminder center communicates the message the user scheduled. The communication of the scheduled reminder message could be in the same format as it was scheduled, or the format may need to be altered to be compatible with the formats accepted by the endpoint being contacted. For example, the user could have scheduled the reminder message by calling into the reminder center and speaking a reminder message to the voice recorder. If the reminder center then contacts the user by a voice enabled endpoint, such as a telephone, the message can be replayed to the user without alteration. If, however, the endpoint used to establish a connection with the user can only accept text messages, such as a pager or a non voice-enabled PDA, then the scheduled voice reminder would have to be translated to a text reminder using speech to text (STT) logic or equipment. The alternate scenario involves a reminder message scheduled in text format. It can be received as is by a text enabled endpoint such as a pager, PDA, and most cellular telephones, but it would have to be converted to an audio message before it could be relayed to a user on a traditional telephone. When this is necessary, the text reminder is converted to an audio reminder using text to speech (TTS) logic or equipment.

In an alternate embodiment the user could determine the format of the reminder message by designating an endpoint or endpoints to receive the reminder. If the scheduled message format is not compatible with the formats accepted by the user defined endpoints for contact, the reminder center could use TTS or STT, as needed, to convert the message to the proper format.

The advantage of the above described embodiment is that it provides a user with maximum flexibility in the scheduling and receiving of reminder messages. Both the medium of communication and the format of the reminder are user determinable and modifiable by the reminder center to insure prompt notification in the most convenient manner.

Although the present invention has been described in detail with reference to particular embodiments, it should be understood that various other changes, substitutions, and alterations may be made hereto without departing from the spirit and scope of the present invention. For example, although the present invention has been described with reference to a number of endpoints 32*a*–32*d* associated with a user 40, these endpoints are not exhaustive of the methods available to schedule and receive reminders of user events. In addition, endpoints and communication methods not yet contemplated could be easily integrated into the event scheduling system. The present invention contemplates great flexibility in the scheduling and communication of reminder messages.

Numerous other changes, substitutions, variations, alterations and modifications may be ascertained by those skilled in the art and it is intended that the present invention encompass all such changes, substitutions, variations, alterations and modifications as falling within the spirit and scope of the appended claims.

What is claimed is:

1. A method for communicating a reminder message, comprising:
    establishing a first connection between a user and a reminder center;
    receiving, from the user, a reminder time;
    scheduling a reminder message at the reminder center;
    terminating the first connection between the user and the reminder center;
    at approximately the reminder time, determining which of a plurality of endpoints associated with the user is available to the user;
    attempting to establish a second connection between the user and the reminder center at approximately the reminder time; and
    communicating the reminder message from the reminder center to the user.

2. The method of claim 1, wherein a presence server is used to determine which of the plurality of endpoints associated with the user is available to the user.

3. The method of claim 1, further comprising:
    selecting a preferred endpoint from any ones of the plurality of endpoints associated with the user that were determined to be available to the user;
    wherein the preferred endpoint is selected from a predefined priority list provided by the user.

4. The method of claim 3, further comprising continuing to attempt to establish the second connection using different ones of the plurality of endpoints in an order of the predefined priority list, until the second connection is established.

5. The method of claim 1, wherein the plurality of endpoints associated with the user is selected from the group consisting of a personal computer, a laptop computer, an analog telephone, an IP Phone, a mobile phone, a pager, a facsimile machine, and a personal digital assistant.

6. The method of claim 1, wherein the reminder message comprises a recorded voice message in the user's voice.

7. The method of claim 1, further comprising:
    receiving a request from the user to delay communication of the reminder message by a period of time; and
    wherein the reminder message is communicated from the reminder center to the user approximately the period of time after the reminder time.

8. The method of claim 7, wherein the period of time is predetermined.

9. The method of claim 1, further comprising:
    allowing the user to select a message priority from a plurality of message priorities; and
    alerting the user according to the message priority selected.

10. A method for communicating a reminder message, comprising:
    establishing a first connection between a user and a reminder center;
    receiving, from the user, a reminder time;
    scheduling a reminder message at the reminder center;
    terminating the first connection between the user and the reminder center;
    selecting, at the reminder center, a preferred endpoint associated with the user, from a plurality of endpoints associated with the user;
    attempting to establish a second connection between the user and the reminder center, using the preferred endpoint associated with the user, at approximately the reminder time;
    establishing the second connection between the user and the reminder center, while the user is communicating with a third party over an existing communication connection; and
    communicating the reminder message to the user without terminating the existing communication connection.

11. The method of claim 10, wherein the reminder message is transparent to the third party.

12. A method for scheduling a reminder, comprising:
    establishing a first connection between a user and a reminder center;
    receiving, from the user, a reminder time;
    scheduling a reminder message at the reminder center;
    terminating the first connection between the user and the reminder center;
    attempting to establish a second connection between the user and the reminder center at approximately the reminder time;
    detecting that the user is communicating with a third party over an existing communication connection; and
    communicating the reminder message to the user while maintaining the existing communication connection.

13. The method of claim 12, wherein the reminder message is transparent to the third party.

14. The method of claim 12, further comprising determining, using a presence server, which of a plurality of endpoints associated with the user is available to the user at approximately the reminder time.

15. The method of claim 12, further comprising selecting an endpoint from a plurality of endpoints on a predefined priority list provided by the user prior to attempting to establish the second connection.

16. The method of claim 15, further comprising continuing to attempt to establish the second connection using different ones of the plurality of endpoints in an order of the predefined priority list, until the second connection is established.

17. The method of claim 12, wherein the reminder message comprises a recorded voice message in the user's voice.

18. The method of claim 12, further comprising:
receiving a request from the user to delay communication of the reminder message by a period of time; and
wherein the reminder message is communicated from the reminder center to the user approximately the period of time after the reminder time.

19. The method of claim 18, wherein the period of time is predetermined.

20. The method of claim 12, further comprising:
allowing the user to select a message priority from a plurality of message priorities; and
alerting the user according to the message priority selected.

21. A method for communicating a reminder message, comprising:
establishing a first connection between a user and a reminder center;
receiving, from the user, a reminder time;
scheduling a reminder message at the reminder center;
terminating the first connection between the user and the reminder center;
selecting, at the reminder center using a presence server, a preferred endpoint associated with the user, from a plurality of endpoints associated with the user;
attempting to establish a second connection between the user and the reminder center, using the preferred endpoint associated with the user, at approximately the reminder time;
detecting that the user is communicating with a third party over an existing communication connection;
receiving a request from the user to delay communication of the reminder message by a period of time; and
communicating the reminder message to the user while maintaining the existing communication connection at approximately the period of time after the reminder time.

22. A system for communicating a reminder message, comprising:
an interface being operable to establish a first connection between a user and a reminder center;
the interface being further operable to receive, from the user, a reminder time;
a reminder center being operable to schedule a reminder message at the reminder center;
the interface being further operable to terminate the first connection between the user and the reminder center;
a processor being operable to determine, at approximately the reminder time, which of a plurality of endpoints associated with the user is available to the user;
the processor being further operable to attempt to establish a second connection between the user and the reminder center approximately the reminder time; and
the processor being further operable to communicate the reminder message from the reminder center to the user.

23. The system of claim 22, wherein a presence server is operable to determine which of the plurality of endpoints associated with the user is available to the user.

24. The system of claim 22, wherein the reminder message comprises a recorded voice message in the user's voice.

25. The system of claim 22, further comprising:
the processor being further operable to receive a request from the user to delay communication of the reminder message by a period of time; and
wherein the reminder message is communicated from the reminder center to the user approximately the period of time after the reminder time.

26. A system for communicating a reminder message, comprising:
an interface being operable to establish a first connection between a user and a reminder center;
the interface being further operable to receive, from the user, a reminder time;
a reminder center being operable to schedule a reminder message at the reminder center;
the interface being further operable to terminate the first connection between the user and the reminder center;
a processor being operable to select, at the reminder center, a preferred endpoint associated with the user, from a plurality of endpoints associated with the user;
the processor being further operable to attempt to establish a second connection between the user and the reminder center, using the preferred endpoint associated with the user, at approximately the reminder time;
the processor being further operable to establish the second connection between the user and the reminder center, while the user is communicating with a third party over an existing communication connection; and
the processor being further operable to communicate the reminder message to the user without terminating the existing communication connection.

27. A system for scheduling a reminder, comprising:
an interface being operable to establish a first connection between a user and a reminder center;
the interface being further operable to receive, from the user, a reminder time;
a reminder center being operable to schedule a reminder message at the reminder center;
the interface being further operable to terminate the first connection between the user and the reminder center;
a processor being operable to attempt to establish a second connection between the user and the reminder center at approximately the reminder time;
the processor being further operable to detect that the user is communicating with a third party over an existing communication connection; and
the processor being further operable to communicate the reminder message to the user while maintaining the existing communication connection.

28. The system of claim 27, wherein the reminder message is transparent to the third party.

29. The system of claim 27, further comprising a presence server operable to determine which of a plurality of endpoints associated with the user is available to the user at approximately the reminder time.

30. The system of claim 27, wherein the reminder message comprises a recorded voice message in the user's voice.

31. The system of claim 27, further comprising:
the processor being further operable to receive a request from the user to delay communication of the reminder message by a period of time; and
wherein the reminder message is communicated from the reminder center to the user approximately the period of time after the reminder time.

32. A system for communicating a reminder message, comprising:
means for establishing a first connection between a user and a reminder center;
means for receiving, from the user, a reminder time;
means for scheduling a reminder message at the reminder center;
means for terminating the first connection between the user and the reminder center;
means for determining, at approximately the reminder time, which of a plurality of endpoints associated with the user is available to the user;
means for attempting to establish a second connection between the user and the reminder center at approximately the reminder time; and
means for communicating the reminder message from the reminder center to the user.

33. The system of claim 32, wherein a presence server is used for determining which of the plurality of endpoints associated with the user is available to the user at approximately the reminder time.

34. The system of claim 32, wherein the reminder message comprises a recorded voice message in the user's voice.

35. The system of claim 32, further comprising:
means for receiving a request from the user to delay communication of the reminder message by a period of time; and
wherein the reminder message is communicated from the reminder center to the user approximately the period of time after the reminder time.

36. A system for communicating a reminder message, comprising:
means for establishing a first connection between a user and a reminder center;
means for receiving, from the user, a reminder time;
means for scheduling a reminder message at the reminder center;
means for terminating the first connection between the user and the reminder center;
means for selecting, at the reminder center, a preferred endpoint associated with the user, from a plurality of endpoints associated with the user;
means for attempting to establish a second connection between the user and the reminder center, using the preferred endpoint associated with the user, at approximately the reminder time;
means for establishing the second connection between the user and the reminder center, while the user is communicating with a third party over an existing communication connection; and
means for communicating the reminder message to the user without terminating the existing communication connection.

37. A system for scheduling a reminder, comprising:
means for establishing a first connection between a user and a reminder center;
means for receiving, from the user, a reminder time;
means for scheduling a reminder message at the reminder center;
means for terminating the first connection between the user and the reminder center;
means for attempting to establish a second connection between the user and the reminder center at approximately the reminder time;
means for detecting that the user is communicating with a third party over an existing communication connection; and
means for communicating the reminder message to the user while maintaining the existing communication connection.

38. The system of claim 37, wherein the reminder message is transparent to the third party.

39. The system of claim 37, further comprising determining, using a presence server, which of a plurality of endpoints associated with the user is available to the user at approximately the reminder time.

40. The system of claim 37, wherein the reminder message comprises a recorded voice message in the user's voice.

41. The system of claim 37, further comprising:
means for receiving a request from the user to delay communication of the reminder message by a period of time; and
wherein the reminder message is communicated from the reminder center to the user approximately the period of time after the reminder time.

42. Software embodied in a computer readable medium, the computer readable medium comprising code operable to:
establish a first connection between a user and a reminder center;
receive, from the user, a reminder time;
schedule a reminder message at the reminder center;
terminate the first connection between the user and the reminder center;
at approximately the reminder time, determine which of a plurality of endpoints associated with the user is available to the user;
attempt to establish a second connection between the user and the reminder center at approximately the reminder time; and
communicate the reminder message from the reminder center to the user.

43. The medium of claim 42, wherein the code is further operable to determine, using a presence server, which of the plurality of endpoints associated with the user is available to the user.

44. The medium of claim 42, wherein the reminder message comprises a recorded voice message in the users's voice.

45. The medium of claim 42, wherein the code is further operable to:
receive a request from the user to delay communication of the reminder message by a period of time; and
wherein the reminder message is communicated from the reminder center to the user approximately the period of time after the reminder time.

46. Software embodied in a computer readable medium, the computer readable medium comprising code operable to:
establish a first connection between a user and a reminder center;
receive, from the user, a reminder time;
schedule a reminder message at the reminder center;
terminate the first connection between the user and the reminder center;
select, at the reminder center, a preferred endpoint associated with the user, from a plurality of endpoints associated with the user;

attempt to establish a second connection between the user and the reminder center, using the preferred endpoint associated with the user, at approximately the reminder time;

establish the second connection between the user and the reminder center, while the user is communicating with a third party over an existing communication connection; and communicate the reminder message to the user without terminating the existing communication connection.

47. Software embodied in a computer readable medium, the computer readable medium comprising code operable to:

establish a first connection between a user and a reminder center;

receive, from the user, a reminder time;

schedule a reminder message at the reminder center;

terminate the first connection between the user and the reminder center;

attempt to establish a second connection between the user and the reminder center at approximately the reminder time;

detect that the user is communicating with a third party over an existing communication connection; and communicate the reminder message to the user while maintaining the existing communication connection.

48. The medium of claim 47, wherein the reminder message is transparent to the third party.

49. The medium of claim 47, wherein the code is further operable to determine, using a presence server, which of a plurality of endpoints associated with the user is available to the user at approximately the reminder time.

50. The medium of claim 47, wherein the reminder message comprises a recorded voice message in the user's voice.

51. The medium of claim 47, wherein the code is further operable to:

receive a request from the user to delay communication of the reminder message by a period of time; and wherein the reminder message is communicated from the reminder center to the user approximately the period of time after the reminder time.

* * * * *